United States Patent [19]

Harada et al.

[11] Patent Number: 5,430,564
[45] Date of Patent: Jul. 4, 1995

[54] PROCESS FOR PRODUCING FERROELECTRIC LIQUID-CRYSTAL CELLS WITH OLEOPHILIC ADDITIVE EMPLOYING HEAT AND LOW PRESSURE OVERLAPPED A SHORT TIME

[75] Inventors: Takamasa Harada, Chiba, Japan; Claus Escher, Mühltal, Germany; Gerhard Illian, Tokyo, Japan; Dieter Ohlendorf, Liederbach/Taunus; Heinz Rieger, Hofheim am Taunus, both of Germany; Norbert Rösch, Frankfurt am Main, Germany

[73] Assignee: Hoechst Aktiengesellschaft, Frankfurt am Main, Germany

[21] Appl. No.: 946,378

[22] Filed: Feb. 5, 1993

[30] Foreign Application Priority Data

Jun. 14, 1990 [JP] Japan .................. 2-156386
Apr. 8, 1991 [JP] Japan .................. 3-075345

[51] Int. Cl.6 .................. G02F 1/1335; G02F 1/13
[52] U.S. Cl. .................. 359/62; 359/80; 359/100; 359/104
[58] Field of Search .................. 359/62, 80, 99, 100, 359/103, 104; 252/299.01, 299.5

[56] References Cited

U.S. PATENT DOCUMENTS

| | | | |
|---|---|---|---|
| 4,634,228 | 1/1987 | Iwasaki et al. | 359/100 |
| 4,784,793 | 11/1988 | Coates et al. | 359/104 |
| 4,917,473 | 4/1990 | Watanabe | 359/62 |
| 4,922,972 | 5/1990 | Watanabe et al. | 141/4 |
| 5,145,546 | 9/1992 | Yausa et al. | 359/62 |
| 5,167,856 | 12/1992 | Harada et al. | 252/299.5 |
| 5,178,792 | 1/1993 | Harada et al. | 252/299.5 |
| 5,238,523 | 8/1993 | Yausa et al. | 359/62 |
| 5,333,675 | 7/1994 | Harada et al. | 359/100 |
| 5,361,152 | 11/1994 | Harada et al. | 359/100 |

FOREIGN PATENT DOCUMENTS

| | | |
|---|---|---|
| 0113064 | 7/1964 | European Pat. Off. . |
| 0348939 | 3/1990 | European Pat. Off. . |
| 60-068322 | 4/1985 | Japan . |
| 61-43725 | 3/1986 | Japan . |
| 63-008630 | 1/1988 | Japan . |
| 4037820 | 2/1992 | Japan . |

*Primary Examiner*—Anita Pellman Gross
*Assistant Examiner*—Kenneth Parker
*Attorney, Agent, or Firm*—Curtis, Morris & Safford, P.C.

[57] ABSTRACT

A process for producing a liquid-crystal cell by using a ferroelectric liquid crystal (FLC) composition containing at least one oleophilic substance that exhibits liquid crystallinity and at least one additive having lower boiling point than said substance, characterized in that said FLC composition is charged into the cell under high-temperature and high-vacuum conditions, provided that the two conditions will not overlap, or will overlap for a sufficiently short time to effectively prevent the evaporation of said additive.

4 Claims, 3 Drawing Sheets

PROCESS FOR PRODUCING FERROELECTRIC LIQUID-CRYSTAL CELLS WITH OLEOPHILIC ADDITIVE EMPLOYING HEAT AND LOW PRESSURE OVERLAPPED A SHORT TIME

FIELD OF THE INVENTION

The present invention relates to a process for producing liquid-crystal cells, more particularly to an improvement of the step of filling a liquid crystal in the process of producing liquid-crystal cells using ferroelectric liquid crystals (FLC) containing a low-boiling point additive.

BACKGROUND OF THE INVENTION

Liquid-crystal cells using FLC have drawn increasing attention as elements that can be used as displays in watches, hand-held calculators, various OA (office automation) equipment and television sets. A liquid-crystal cell using FLC is manufactured by a process that comprises the steps of providing a pair of glass substrates each equipped with and electrode and an alignment film, bonding the periphery of each substrate with a sealant so as to leave a central hollow portion that is to be filled with a liquid crystal, and filling the cell under high-temperature and high-vacuum condition with a liquid crystal that is injected through a preliminarily formed inlet. Another way to produce a liquid-crystal cell comprises providing a sealant in the periphery of a glass substrate equipped with an electrode and an alignment film, coating the sealant-surrounded portion with a liquid crystal to a predetermined thickness by a suitable means such as coating or printing, superposing the other glass substrate on the first glass substrate, and compressing them together with the sealant heated to an elevated temperature.

Various proposals about FLC compositions have been made with a view to improving the display capability of liquid-crystal cells. The present inventors previously found that satisfactory displays having high contrast and free from afterimage could be obtained by adding to FLC compositions those oleophilic compounds, or compounds that were rendered lipophilic, which were either cyclic or possessed of structures capable of forming cycles or cages, with particularly good results being achieved by adding compounds that worked as complex forming ligands with respect to ions. An example of such compounds is at least one oleophilic compound represented by the general formula (I):

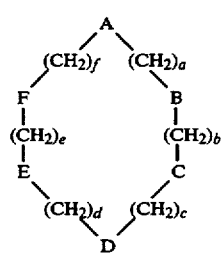

where a, b, c, d, e and f are each independently an integer of 0–4, provided that a+b+c+d+e+f is greater than 7; —A—, —B—, —C—, —D—, —E— and —F— which may be the same or different are each a group selected from among —$CH_2$—, —CHR'—, —CH=CH—,

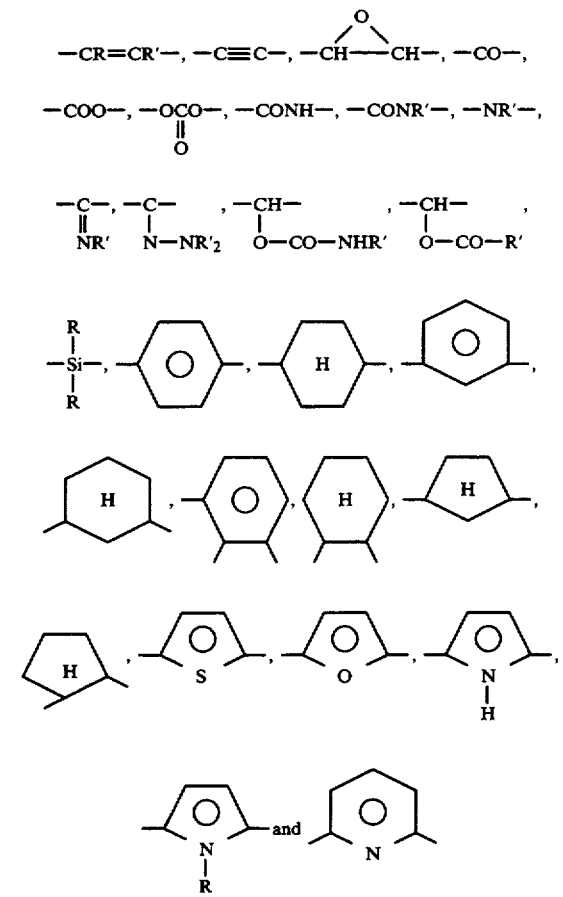

(where R is an alkyl having 1-12 carbon atoms; R' is an alkyl having 1-12 carbon atoms) the group —$CH_2$— may be substituted by —O—, —COO—, —OCO—, phenyl, Cl, F or CN.

It is preferred to use macrocyclic compounds of the general formula (I) where a, b, c, d, e, f, R and R' have the same meanings as defined above, —B—, —C—, —E—, and —F— are each a group —$CH_2$, and —A— and —D— which may be the same of different are each a group selected from among

—$CH_2$—, —CHR'—, —CH=CH—, —CR=CR'—,

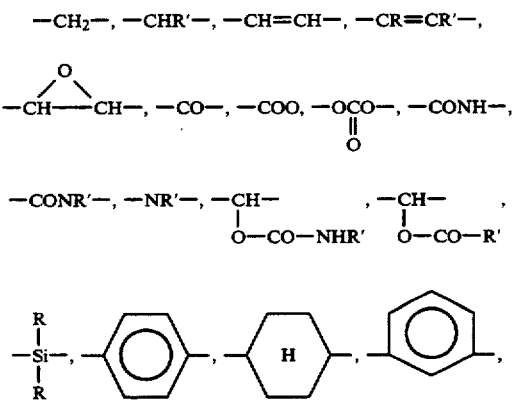

-continued

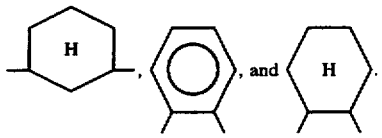

It is particularly preferred to use olephilic compounds of the general formulas (I) where a, b, c, d, e and f are each independently an integer of 0–3; —B—, —C—, —E— and —F— are each a group —CH$_2$—; —A— and —D— which may be the same or different are each group a selected from among

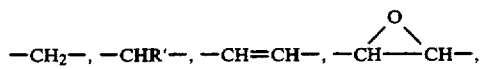

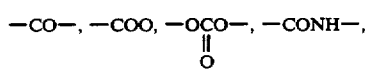

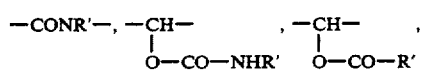

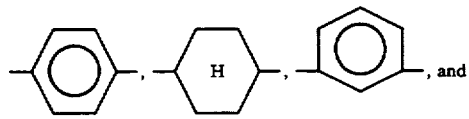

(where R is an alkyl having 1–12 carbon atoms and R' is an alkyl having 1–12 carbon atoms or a phenyl).

In a more preferred embodiment, groups —A— and —D— are selected from among

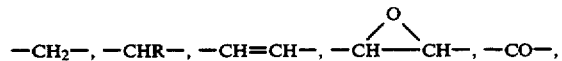

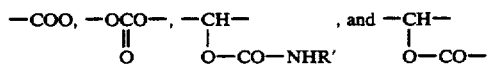

An amide that serves as an inophore and that is represented by the following general formula (II) can also be added to FLC composition:

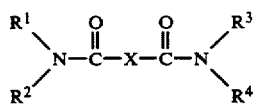         (II)

where $R^1$, $R^2$, $R^3$ and $R^4$ are each independently an alkyl having 1–15 carbon atoms at least one —CH$_2$ group in which may be substituted by —COO—, —CO— or —O—, a cyclohexyl, a phenyl or a benzyl; X is an alkylene having 2–9 carbon atoms, with one or two non-adjacent —CH$_2$— groups being optionally substituted by —O—, with two adjacent CH$_2$ groups being optionally substituted by 1,2-phenylene or 1,2-cyclohexylene, with two adjacent —CH$_2$— groups being optionally substituted by CH(CH$_3$)—CH(CH$_3$)—, and with the hydrogen atoms in the groups CH$_2$ being optionally substituted by $R^5$ or $R^6$, provided that $R^5$ is an alkyl having 1–15 carbon atoms and $R^6$ is an alkyl having 1–15 carbon atoms or CH$_2$—O—CH$_2$—CO—NR$^1$R$^2$.

It is preferred to use a ferroelectric liquid-crystal mixture containing an amide of the formula (II), where $R^1$, $R^2$, $R^3$ and $R^4$ are each independently an alkyl having 1–15 carbon atoms at least one —CH$_2$— group in which is optionally substituted by —COO— or —O—, a cyclohexyl or a phenyl; X is an alkylene having 2–9 carbon atoms, with one or two non-adjacent —CH$_2$— groups being optionally substituted by —O—, with two adjacent CH$_2$ groups being optionally substituted by 1,2-phenylene or 1,2-cyclohexylene, with two adjacent —CH$_2$— groups being optionally substituted by CH(CH$_3$)—CH(CH$_3$)—, and with the hydrogen atoms in the groups CH$_2$ being optionally substituted by $R^5$ or $R^6$, provided that $R^5$ and $R^6$ are each independently an alkyl having 1–15 carbon atoms.

Particularly preferred is an amide of the formula (II), where $R^1$, $R^2$, $R^3$ and $R^4$ are each independently an alkyl having 1–15 carbon atoms, in which one —CH$_2$— group is optionally substituted by —COO—, or a cyclohexyl; X is an alkylene having 2–9 carbon atoms, with one or two non-adjacent —CH$_2$— groups being optionally substituted by —O—, with two adjacent CH$_2$ groups being optionally substituted by 1,2-phenylene, and with two adjacent —CH$_2$— groups being optionally substituted by —CH(CH$_3$)—CH(CH$_3$)—.

Particularly preferred is an amide of the formula (II) where —X— is a group selected from among the following:

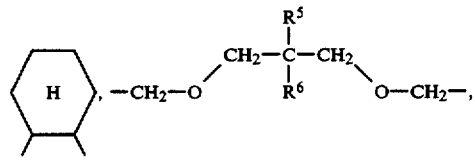

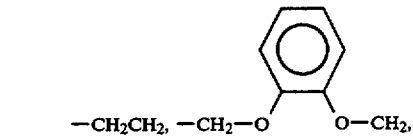

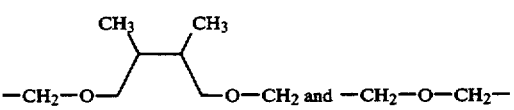

where $R^1$-$R^6$ have the same meanings as defined above.

Most preferably, —X— is a group selected from among the following:

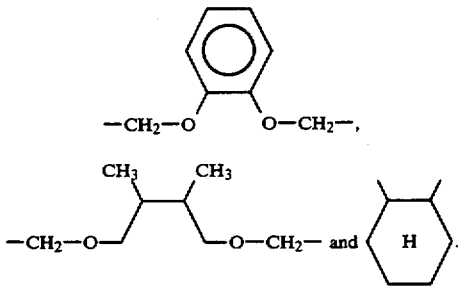

In principle, a broad range of inophores are suitable for use in liquid-crystal mixtures but amides of the formula (II) are particularly suitable for suppressing a twisted state.

Compounds represented by the following general formula (III) or (IV) are also useful:

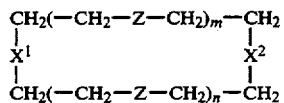  (III)

where —Z— is —O— or —S—; m and n are each an integer greater than 0, provided that m+n is 2-6; —X$^1$— and —X$^2$— which may be the same or different each represents

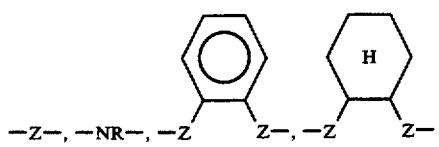

when —X$^1$— and —X$^2$— are taken together,

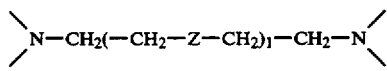

or

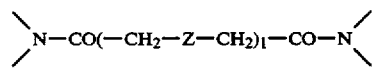

(where —R is an alkyl or alkanoyl having 1-15 carbon atoms, a phenyl, a benzyl or a benzoyl; and I is 1 or 2);

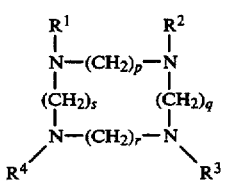  (IV)

where R$^1$, R$^2$, R$^3$ and R$^4$ are each independently

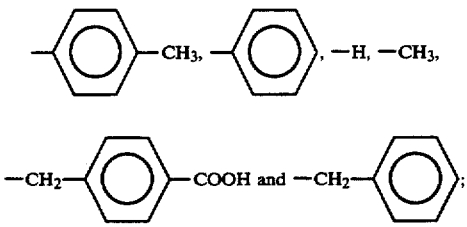

p, q, r and s are each independently an integer of 2-4, provided that p+q+r+s is 88−16.

It is preferred to use a compound of the general formula (III) where m and n are each an integer greater than 0, provided that m+n is 2-4; —X$^1$— and —X$^2$— which may be the same or different each represents

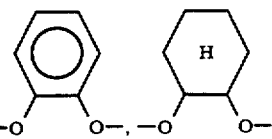

when —X$^1$— and —X$^2$— are taken together,

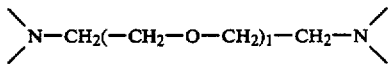

(where —R is an alkyl or alkanoyl having 1-15 carbon atoms, a phenyl, a benzyl or a benzoyl; and I is 1 or 2).

It is also preferred to use a compound of the general formula (II) where

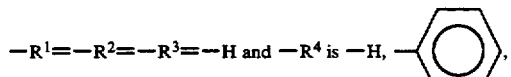

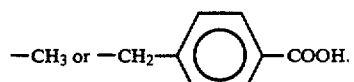

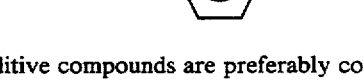

The additive compounds are preferably contained in amounts of 0.01-10 mol %, more preferably 0.1-10 mol %, of the FLC mixture.

When two or more additive compounds are to be present in an FLC mixture, their total amount is in the range of 0.01-10 mol %, preferably 1-10 mol %.

However, the additives described above have low boiling points and hence will evaporate under the high-temperature and high-vacuum conditions that are employed in the already described process for producing liquid-crystal cells. As a result, those additives fail to fulfill their intended function.

SUMMARY OF THE INVENTION

The present invention has been accomplished in order to solve the aforementioned problem encountered with filling liquid-crystal cells with FLC compositions that contain additives having lower boiling points than substances that exhibit liquid crystallinity. The present invention provides a process for producing a liquid crystal cell by using a ferroelectric liquid crystals (FLC) composition containing at least one substance that exhibits liquid crystallinity and at least one additive having lower boiling point than said substance, characterized in that said FLC composition is charged into the cell under high-temperature and high-vacuum conditions, provided that the two conditions will not overlap or will overlap for a sufficiently short time to effectively prevent the evaporation of said additive.

The process of the present invention is so controlled that the two process conditions, high temperature and high vacuum, for filling with a liquid crystal will not overlap each other, or that any overlap should continue only for a short period that effectively prevents the additive from evaporating (without losing its inherent function while it is contained in the liquid-crystal composition). To this end, the present invention embraces two specific methods as described below. The first method is a process for producing a liquid-crystal cell by using a ferroelectric liquid crystal (FLC) composition containing at least one substance that exhibits liquid crystallinity and at least one additive having lower boiling point than said substance which comprises the steps of;

(a) providing a sealant portion made of a curable sealant in the periphey of the side of an electrode plate that has an electrode or electrodes;

(b) (i) coating a liquid-crystal composition on the portion surrounded by the periphery of the electrode plate, with a spacer being preliminarily provided in said portion;

(ii) coating spacer-containing liquid-crystal composition on the portion surrounded by the periphery of the electrode plate; or (iii) coating a liquid-crystal composition on the portion surrounded by the periphery of the electrode plate and thereafter providing a spacer over said composition;

(c) carrying out the defoaming of the liquid-crystal composition coating layer under vacuum and then lowering the degree of vacuum of the atmosphere surrounding the liquid-crystal composition, or returning the atmosphere to an atmospheric pressure, (d) heating the liquid-crystal composition coating layer to convert the layer to a nematic phase or isotropic liquid, thereby smoothing the surface of the layer, (e) overlapping the other electrode plate on the liquid-crystal composition coating layer of the electrode plate under vacuum and then compressing the two electrode plates together;

(f) curing said sealant; and (g) heating the liquid-crystal cell under atmospheric pressure to make the layer of the liquid-crystal composition homogeneous.

The above-described process of the present invention is preferably performed in the order of a, b, c, d, e, f and g, or in the order of b, c, d, e, a, f and g.

BRIEF DESCRIPTION OF THE DRAWINGS

FIGS. 1a–1c show schematically an example of the process of the present invention, in which FIGS. 1a and 1b are plan views and FIG. 1c is a perspective view;

FIGS. 2a–2c show schematically another example of the process of the present invention, in which FIG. 2a is a plan view and FIGS. 2b and 2c are perspective views.

Figure 1A:
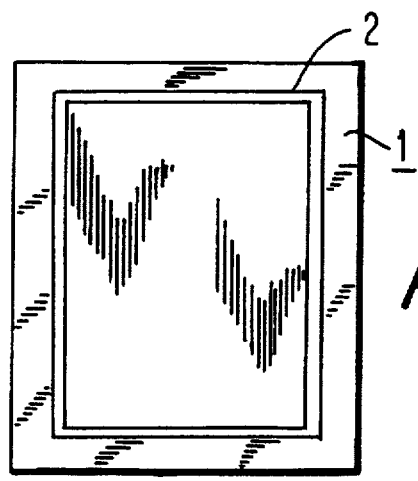

| 1, 4 | electrode plate |
| 2 | sealant portion |
| 3 | FLC composition coating layer |
| 5 | pressure |
| 6 | inlet |
| 7 | FLC composition |
| 8 | resistor |

DETAILED DESCRIPTION

In step (b), the spacer can be provided by one or more of the following methods:

i) the spacer is sprayed before the composition is coated;

ii) the composition containing the spacer is coated to from a layer that contains iii) the spacer is sprayed over the coated layer of the composition;

iv) a photosensitive resin layer is provided on the electrode plate and partially exposed to light, followed by development of the exposed or non-exposed area to form a spacer (directly), which is then coated with the composition (the photosensitive resin may be positive- or negative-type); and v) the surface of the substrate which is typically made of glass is partially etched to form a spacer (directly) and the composition is subsequently coated.

The purpose of providing the spacer is to provide a cell of uniform thickness.

Methods i) and iii) may be implemented by either a wet system (using Freon gases as a carrier) or a dry system (dusting air).

In method iv), either positive-type or negative-type photoresists can be used as photosensitive resins. An example of the positive-type photosensitive resins is AZ 1300 SF of Hoechst AG and an example of the negative-type photosensitive resins is OZATEC NL 143 of Hoechst AG. The photosensitive resin is coated in a thickness of 0.5–10 μm, preferably 1.5–3 μm, as measured after development.

Except in method iv), the spacer has a diameter of 0.5–10 μm, preferably 1.5–3 μm, and may be made of an inorganic material such as silicon oxide, or a polymer selected from among acrylic resins and epoxy resins. The shape of the spacer is not limited in any particular way and it may be in the form of a true sphere, a rod, a prism, etc., with a true spherical shape being preferred. The spacer is used in an amount of 0.1–10 wt %, preferably 1–5 wt %, of the total amount of the composition.

Examples of the curable sealant that can be used include low-temperature (heat) curable sealants such as epoxy resins that cure at temperatures of ca. 100°–150° C., and uv curable sealants.

The second method of implementing the process of the present invention is a process for producing a liquid-crystal cell by using a ferroelectric liquid crystal (FLC) composition containing at least one substance that exhibits liquid crystallinity and at least one additive having lower boiling point than said substance which comprises the steps of placing a pair of electrode plates in such a way that their electrode sides face each other, bonding the priphery of the two electrode plates with an adhesive, thereby forming a cell having a hollow portion to be filled with a liquid crystal and an inlet for injecting the liquid crystal, evacuating the cell to high vacuum, heating the neighborhood of said inlet to an elevated temperature, applying a liquid-crystal composition to close the inlet, immediately lowering the degree of vacuum in the cell, heating the whole call so that it is filled with the liquid crystal, and finally sealing the inlet.

Examples of the present invention are described below with reference to the accompanying drawings. The FLC composition M1 used in those examples had the following formula:

11.62 of H₁₇C₈—O—[pyrimidine]—[phenyl]—O—C₆H₁₃

3.90 of H₁₇C₈—O—[pyrimidine]—[phenyl]—O—C₈H₁₇

12.83 of H₁₇C₈—O—[pyrimidine]—[phenyl]—O—C₄H₉

7.06 of H₁₇C₈—O—[pyrimidine]—[phenyl]—O—C₁₀H₂₁

7.08 of H₁₇C₈—O—[pyrimidine]—[phenyl]—O—C₁₂H₂₅

16.53 of H₂₁C₁₀—[pyrimidine]—[phenyl]—O—CO—[cyclohexyl-H]—C₅H₁₁

10.42 of H₁₇C₈—[pyrimidine]—[phenyl]—OC₁₂H₂₅

17.36 of H₁₇C₈—[pyrimidine]—[phenyl]—OCO—C₆H₁₃

4.48 of H₁₇C₈—O—[pyrimidine]—[phenyl]—OCH₂—[chiral spiro group] (S)

2.67 of C₈H₁₇—O—[pyrimidine]—[phenyl]—O—CO—[epoxide]—C₃H₇
(R) cis (R)

5.05 of C₈H₁₇—O—[pyrimidine]—[phenyl]—O—CH₂—[epoxide]—C₄H₉
(S) trans (S)

1.00 of [cryptand structure]

The FLC composition M1 undergoes a phase transfer of $S_C^*61S_A^*69N^*95I$ and has spontaneous polarization of 30 nC×cm² at 20° C.

Exemplary oleophilic compounds or compounds that are rendered oleophilic are listed below:

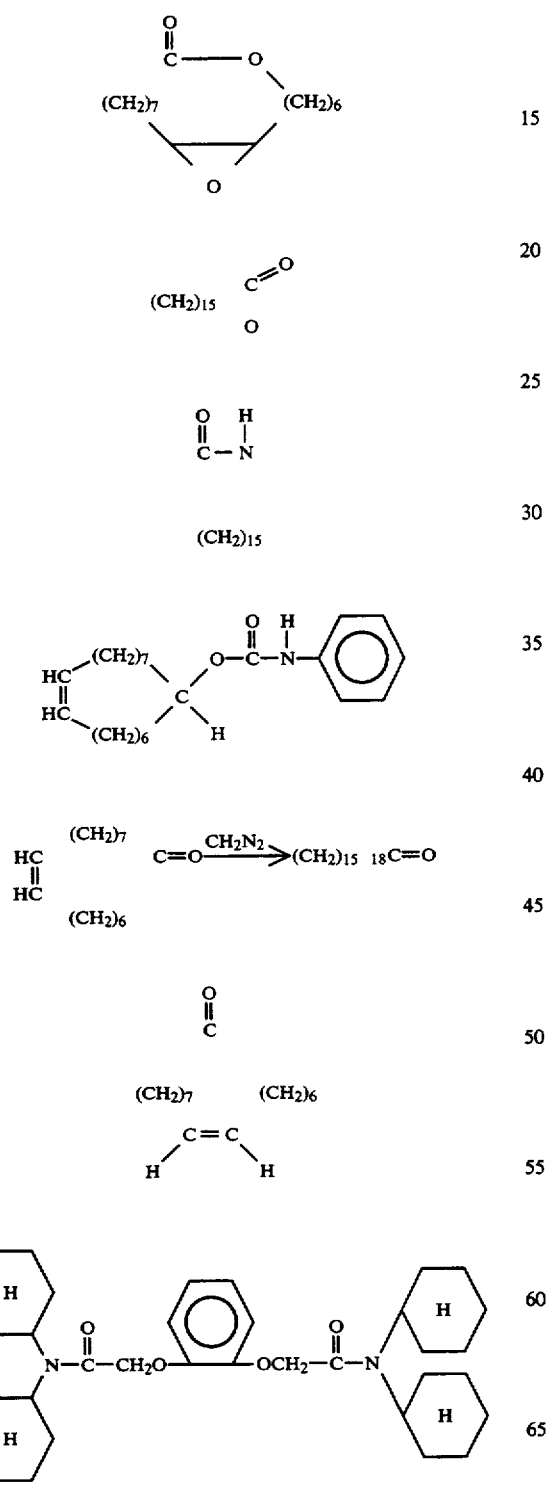

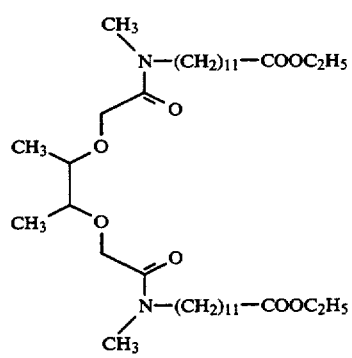

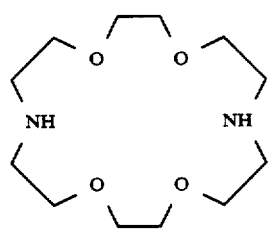

1,7,10,16-Tetraoxa-4,13-diazabicyclooctadecane [Kryptofix ® 22]:

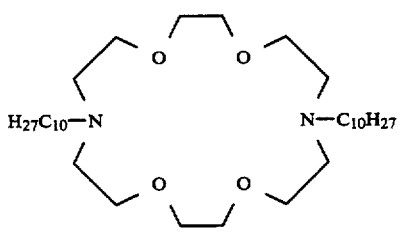

4,3-Didecyl-1,7,10,16-tetraoxa-4,13-diazacyclooctadecane [Kryptofix ® 22DD]:

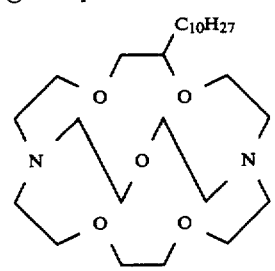

5-Decyl-4,7,13,16,21-pentaoxa-1,10-diazabicyclo[8,8,5]-tricosane [Kryptofix ® 22D]:

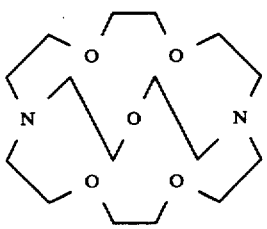

4,7,13,16,21-Pentaoxa-1,10-diazabicyclo[8,8,5]-tricosane [Kryptofix ® 221]:

-continued

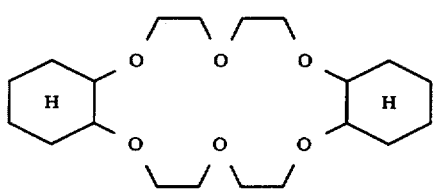

2,5,8,15,18,21-Hexaoxatricyclo[20.4.0.0$^{9,14}$]hexacosane (dicyclohexy-18-crown-6):

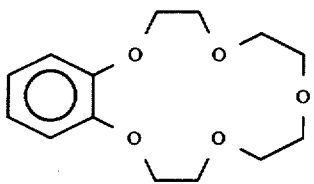

1,4,7,10,13-Pentaoxa[13]-orthocyclophan(benzo-15-crown-5):

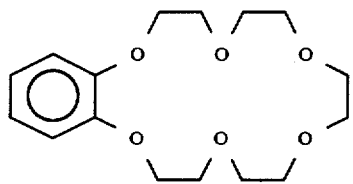

1,4,7,10,13,16-Hexaoxa[16]orthocyclophan-(benzo-18-crown-6):

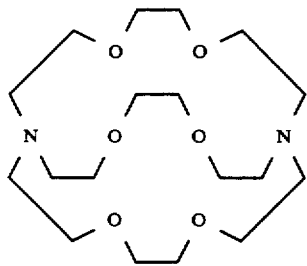

4,7,13,16,21,24-Hexaoxa-1,10-diazabicyclo[8,8,8]-octacosane [Kryptofix$^R$ 222]:

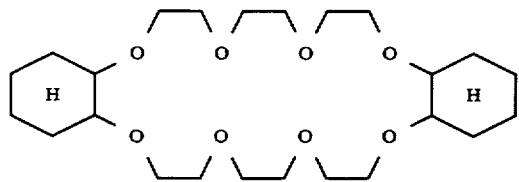

2,5,8,11,18,21,24,27-Octaoxatricyclo[26.4.00$^{12,17}$]-dotriacontane (dicyclohexyl-24-crown-8):

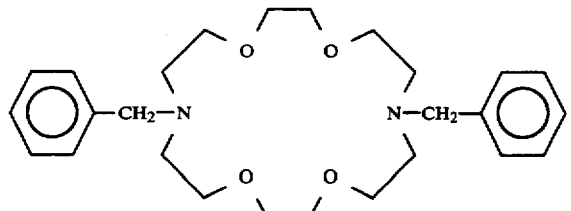

N,N'-Dibenzyl-1,4,10,13-tetraoxa-7,16-diazabicyclooctadecane:

-continued

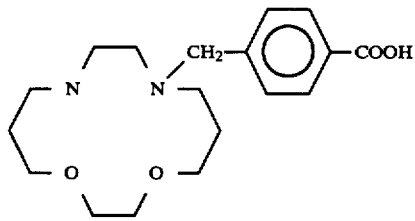

N-(4-Carboxybenzyl)-1,4,8,11-tetraazatetradecane:

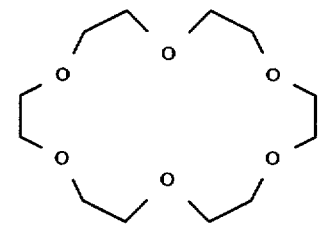

EXAMPLE 1

Figure 1B:
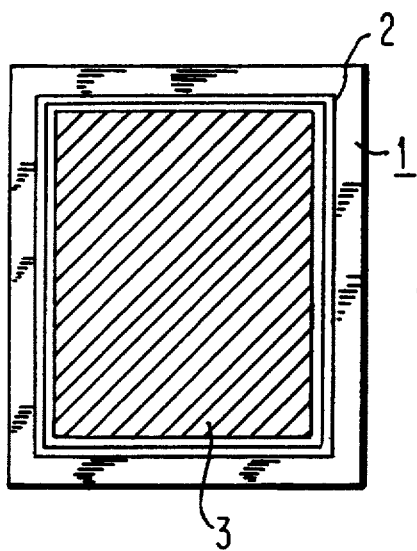
Figure 1C:
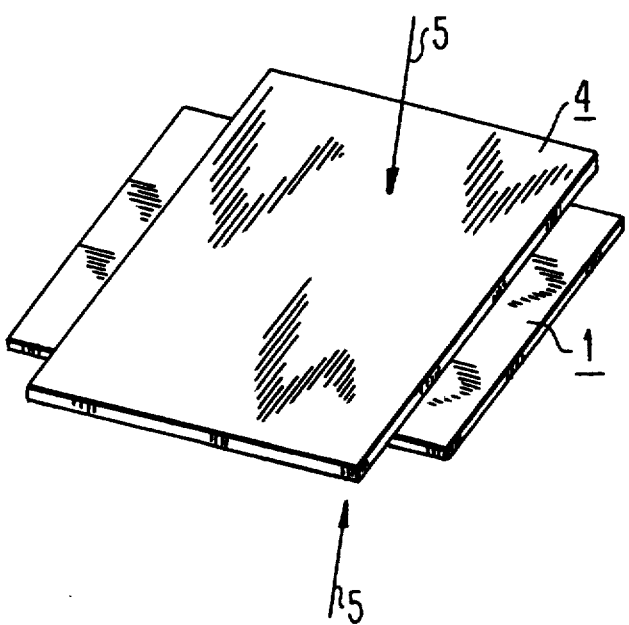

ITO transparent electrode and polyimide orientation layer were placed on a glass plate 1. An ultraviolet-curable epoxy resin (Hoechst AG, Epoxy Resin Beckopox) was applied on the periphery of the orientation membrane by using screen printing at a thickness of 10μ without installing an opening for injection of FLC, thereby forming the sealing agent 2 10μ, thick (refer to FIG. 1(a)). Thereafter, FLC composition M₁ containing a lower boiling point additive and incorporating a spacer (SiO$_2$ as true spherical beads of 2 μm in diameter) in an amount of 3 wt % of the total composition was coated on the sealant portion in the periphery by intaglio printing in an appropriate and correct amount (say, in a thickness of 2 μm), thereby forming an FLC coating layer 3 (refer to FIG. 1(b)). In order to remove air present in the FLC composition M₁, the plate was placed under vacuum (preferably $10^{-2}$ to $10^{-4}$ Torr). After about 30 minutes, the air in FLC composition M₁ was removed. The plate was removed from the vacuum, and heated (e.g. at 7°–100° C.) until the FLC composition was converted to an isotropic liquid or nematic phase. As a result, the air which had not been removed even when the plate had been placed under vacuum was completely removed, and the surface of the liquid-crystal composition could be smoothed. Since the plate was not exposed to a high vacuum and a high temperature, the lower boiling point additive in the FLC composition did not evaporated and remained present in a constant amount in the composition. Thereafter, the electrode plate thus treated and the other electrode plate 4 not having a sealing agent and FLC coating, were compressed under vacuum with pressure 5 applied, until The cell gap decreased to about 2 μm (refer to FIG. 1(c)). Ultraviolet radiation was applied to the sealing agent while or after compressing the plates, thereby curing the sealing agent to make a cell. Thereafter, the vacuum foam in the liquid crystal composition was removed by heating the cell. None of the low-boiling point additive had been lost from the cell. Further, the liquid-crystal cell fabricated in Example 1 exhibited satisfactory display performance without suffering from the uneven adsorption (chromatographic phenomenon) of the low-boiling point additive onto the alignment film which would have occurred in the prior art injection method on account of such factors as capillarity from the inlet for the injection of liquid crystal.

EXAMPLE 2

Figure 2A:
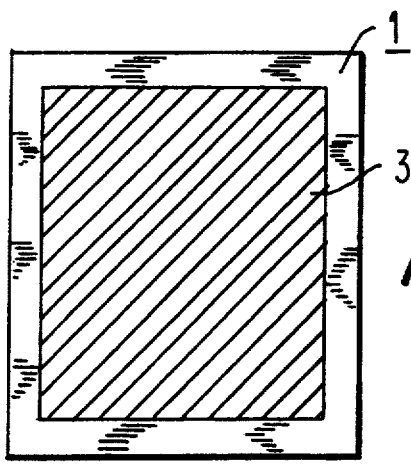
Figure 2B:
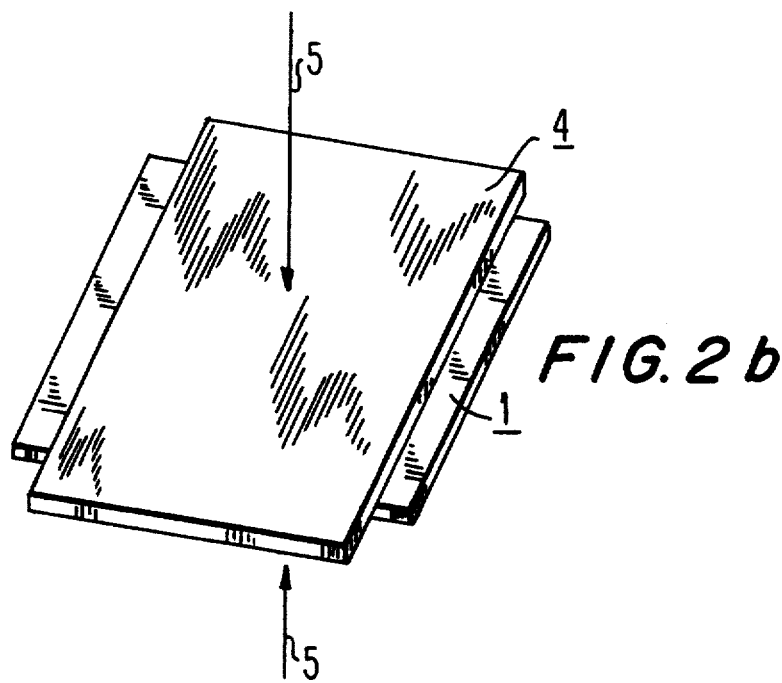
Figure 2C:
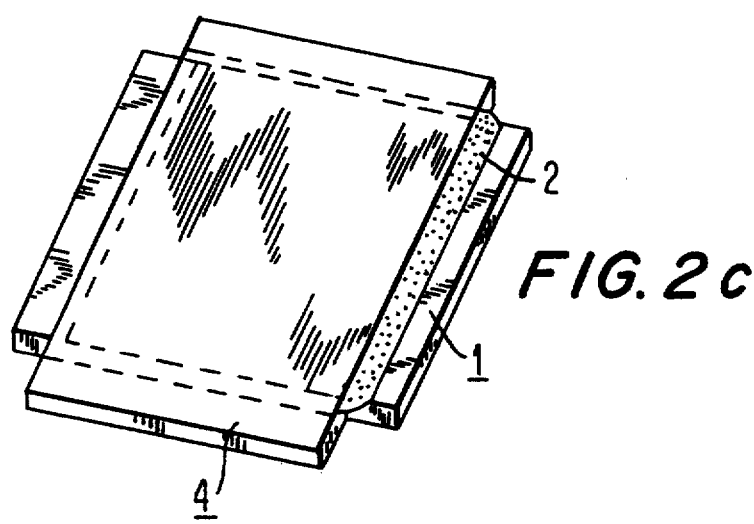

A transparent electrode (which may be ITO) 1 and an alignment film of a resin such as polyimide were provided on a substrate 1 (which may be a glass plate). An FLC composition $M_1$ containing a lower boiling point additive and incorporating a spacer ($SiO_2$ as true spherical beads of 2 μm in diameter) in an amount of 3 wt % of the total composition was roll-coated onto the alignment film inside the periphery in an apropriate and correct amount (say, in a thickness of 2 μm), thereby forming a coated layer 3 of FLC composition (see FIG. 2a). In order to remove air present in the composition $M_1$, the substrate was placed under vacuum (preferably ca. $10^{-2}$ to $10^{-4}$ Torr). In ca. 30 min, almost all air in the composition $M_1$ could be removed. Thereafter, the substrate was removed from the vacuum and heated (e.g. ca. 70°-100° C.) until the composition $M_1$ turned to an isotropic liquid or nematic phase. As a result, the air which had not been removed by standing in vacuo was completely removed and the surface of the liquid-crystal composition could be smoothed. Since the substrate was treated neither under high vacuum nor at high temperature, the low-boiling point additive in the composition did not evaporated but instead remained unchanged. Thereafter, the substrate thus treated and the other substrate 4 having no coating of liquid crystal were compressed under vacuum with pressure 5 being applied, until the cell gap decreased to ca. 2 μm (see FIG. 2b). An uv curable epoxy resin was coated onto the peripry of the cell, while or after compressing it, to thereby provide a sealant portion 2. Subsequently, the applied epoxy resin was cured by exposure to ultraviolet radiation, whereupon the cell was immobilized (see FIG. 2c). Thereafter, the vacuum foam in the liquid-crystal composition was removed by reheating the cell. None of the low-boiling point additive had been lost from the cell. Further, the liquid-crystal cell fabricated in Example 2 exhibited satisfactory display performance without suffering from the uneven adsorption (chromatographic phenomenon) of the low-boiling point additive onto the alignment film which would have occurred in the prior art injection method on account of such factors as capillarity from the inlet for the injection of liquid crystal.

EXAMPLE 2

Figure 3A:
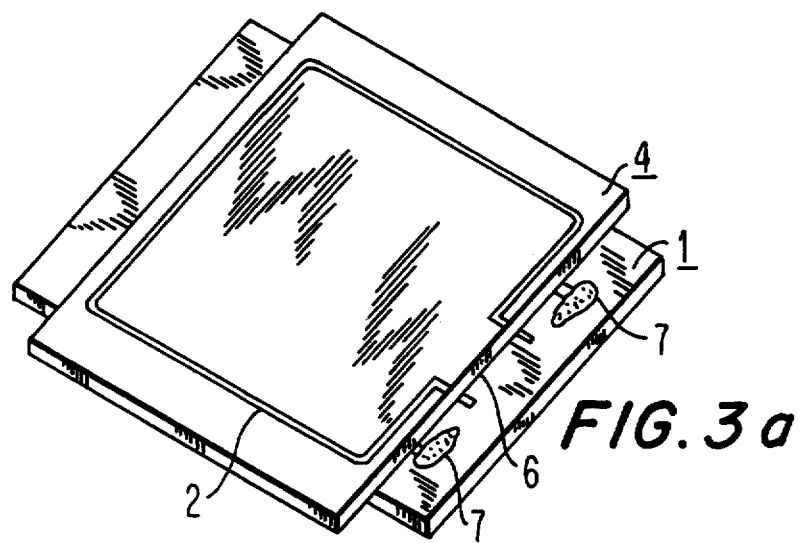
FIGS. 3a–3c are perspective views showing schematically still another example of the process of the present invention.
Figure 3B:
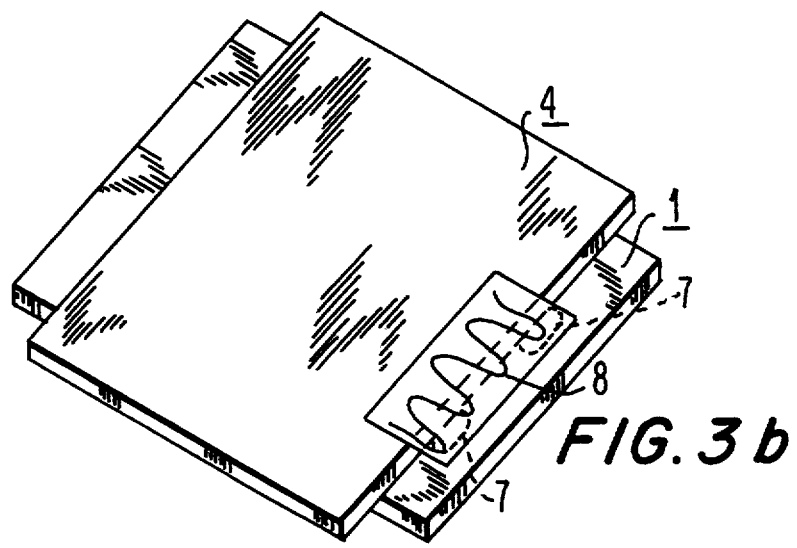
Figure 3C:
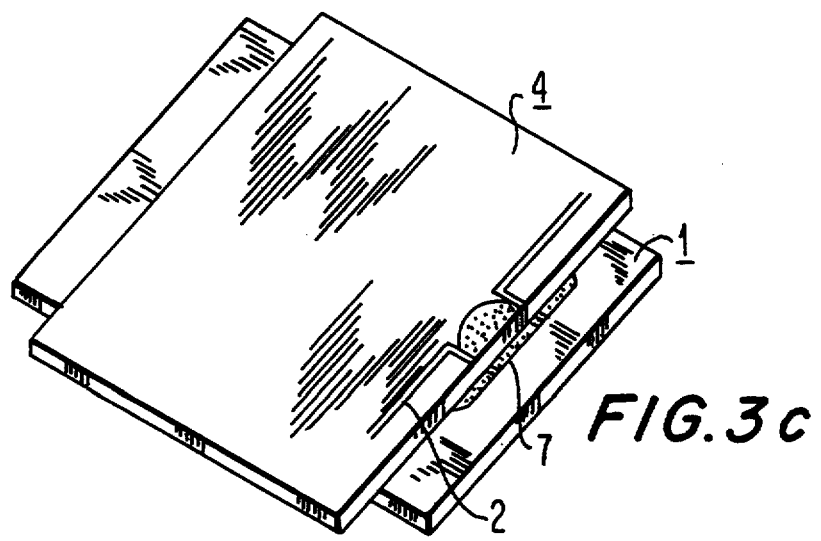

The liquid crystal cell was prepared according to the prior method. The FLC composition $M_1$ containing a lower boiling point additive (FLC composition 7) was applied to the inlet 6 of the cell and the portion adjacent to the inlet. Air was removed from the cell (refer to FIG. 3(a)). The FLC composition 7 was heated by passing a current through resistor 8 installed to the portion near inlet 6, whereby the FLC composition 7 was quickly converted to an isotropic liquid or nematic phase (refer to FIG. 3(b)). FLC composition 7 started to get into the inlet by capillary action. As soon as the liquid-crystal closed the inlet 6 (see FIG. 3c), the degree of vacuum was lowered to establish low vacuum or achieve reversion to an atmospheric pressure. With the whole cell being heated, the liquid crystal continuously injected into the cell until it was filled with the liquid-crystal composition. Thereafter, the inlet was sealed with a two-pack epoxy resin. Since the cell was exposed to high vacuum and high temperature only for a very short period, the lower boiling point additive in the FLC composition did not evaporate and the cell exhibited satisfactory display performance. The period for which the FLC composition $M_1$ could be exposed to high vacuum and high temperature was within about 10 minutes. The period was only 5 minutes in Example 3.

We claim:

1. A process for producing a liquid-crystal cell by using a ferroelectric liquid-crystal (FLC) composition containing at least one substance that exhibits liquid crystallinity and at least one oleophilic additive having a lower boiling point than said substance comprising charging said FLC composition into a cell at a temperature effective to convert the FLC composition to an isotropic or nematic phase and under a vacuum of about $10^{-2}$ to about $10^{-4}$ Torr, provided that the two conditions will not overlap or will not overlap for more than about 10 minutes to effectively prevent the evaporation of said additive.

2. The process of claim 1, comprising placing a pair of electrode plates in such a way that their electrode sides face each other, bonding the periphery of the two electrode plates with a sealant, thereby forming a cell having a hollow portion to be filled with at least one liquid crystal and an inlet for injecting the liquid crystal, evacuating the cell to a vacuum of about $10^{-2}$ to about $10^{-4}$ Torr and heating the neighborhood of said inlet to a temperature, thereby converting the FLC composition to an isotropic or nematic phase then applying the liquid-crystal composition to close the inlet, immediately lowering the degree of vacuum in the cell and heating the whole cell so that it fills with the liquid crystal, and finally sealing the inlet.

3. The process of claim 1, comprising the steps of (in the following order):
   (a) providing a sealant portion made of a curable sealant in the periphery of the side of an electrode plate that has an electrode or electrodes;
   (b)
     (i) coating a liquid-crystal composition on the portion surrounded by the periphery of the electrode plate, with a spacer being preliminary provided in said portion;
     (ii) coating spacer-containing liquid-crystal composition on the portion surrounded by the periphery of the electrode plate; or
     (iii) coating a liquid-crystal composition on the portion surrounded by the periphery of the electrode plate and thereafter providing a spacer over said composition;
   (c) defoaming of the liquid-crystal composition coating layer under vacuum and then lowering the degree of vacuum of the atmosphere surrounding the liquid-crystal composition, or returning the atmosphere to an atmospheric pressure;
   (d) heating the liquid-crystal composition coating layer to convert the layer to a nematic phase or isotropic liquid, thereby smoothing the surface of the layer;
   (e) overlapping the other electrode plate on the liquid-crystal composition coating layer of the electrode plate under vacuum and then compressing the two electrode plates together;
   (f) curing said sealant; and
   (g) heating the liquid-crystal cell under atmospheric pressure to make the layer of the liquid-crystal composition homogeneous.

4. The process of claim 1, comprising the steps of (in the following order):
   (a)
   (i) coating a liquid-crystal composition on the portion surrounded by the periphery of the electrode plate, with a spacer being preliminarily provided in said portion;
   (ii) coating spacer-containing liquid-crystal composition on the portion surrounded by the periphery of the electrode plate; or
   (iii) coating a liquid-crystal composition on the portion surrounded by the periphery of the electrode plate and thereafter providing a spacer over said composition;
   (b) defoaming of the liquid-crystal composition coating layer under vacuum and then lowering the degree of vacuum of the atmosphere surrounding the liquid-crystal composition, or returning the atmosphere to an atmospheric pressure;
   (c) heating the liquid-crystal composition coating layer to convert the layer to a nematic phase or isotropic liquid, thereby smoothing the surface of the layer;
   (d) overlapping the other electrode plate on the liquid-crystal composition coating layer of the electrode plate under vacuum and then compressing the two electrode plates together;
   (e) providing a sealant portion made of a curable sealant in the periphery of the side of an electrode plate that has an electrode or electrodes;
   (f) curing said sealant; and
   (g) heating the liquid-crystal cell under atmospheric pressure to make the layer of the liquid-crystal composition homogeneous.

* * * * *

UNITED STATES PATENT AND TRADEMARK OFFICE
CERTIFICATE OF CORRECTION

PATENT NO. : 5,430,564
DATED : July 4, 1995
INVENTOR(S) : Harada et al.

It is certified that error appears in the above-indentified patent and that said Letters Patent is hereby corrected as shown below:

On the title page, item [22], change item
"[22] Filed February 5, 1993"

to —[22] PCT Filed: June 14, 1991
    [86] PCT No.: PCT/JP91/00806
    § 371 Date: February 5, 1993
    § 102(e) Date: February 5, 1993
    [87] PCT Pub. No.: WO/9120012
         PCT Pub. Date: 12/26/91—.

Signed and Sealed this

Twenty-fourth Day of December, 1996

Attest:

BRUCE LEHMAN

*Attesting Officer*   *Commissioner of Patents and Trademarks*